June 15, 1965 A. TALEFF ETAL 3,189,241
AUTOMATIC HIGH TEMPERATURE SOLDERING MACHINE
Filed Dec. 30, 1960 6 Sheets-Sheet 1

3,189,241
AUTOMATIC HIGH TEMPERATURE
SOLDERING MACHINE
Alexander Taleff and Harry P. Kipple, Penn Hills Township, Allegheny County, Pa., assignors to Westinghouse Electric Corporation, East Pittsburgh, Pa., a corporation of Pennsylvania
Filed Dec. 30, 1960, Ser. No. 79,622
4 Claims. (Cl. 228—37)

This invention relates to a soldering machine and more particularly to a machine for substantially automatically soldering the commutator risers, or necks, of dynamoelectric machines using commutators.

To fully appreciate the novel features of this invention, and the contributions to the art made by it, a brief discussion of prior art methods and apparatus may be most helpful.

In the past years there have been several methods used to solder commutator risers of both open and solid types; namely, induction heating, pot soldering, and hand soldering.

Induction heating and pot soldering methods do a very satisfactory soldering job but for both methods the initial cost is high.

For the high frequency soldering method, that is, the induction heating method, the present equipment cost is approximately from $20,000.00 to $25,000.00 for equipment to do a quality job for any reputable and sizeable shop. The normal speed of induction soldering is approximately 1" a minute. This is undoubtedly a time saving over the hand soldering method but the initial cost cannot be justified except for shops having a large production of armatures of a uniform size. The induction soldering method thus does not lend itself to use in repair shops where the soldering load is sporadic and the armature sizes vary over a wide range.

The pot soldering method is a fast operation and a satisfactory operation from the standpoint of the quality of the soldering done. In this method the armature is preheated and held in a vertical position while being slowly lowered into a pot of molten solder. This method relies completely on capillary action for soldering the leads to the commutator riser necks. Solder pots can be readily purchased in various sizes. A solder pot for a motor having a 21" diameter at present costs between $5000.00 and $7000.00. To take care of slightly larger rotors some adapter rings may be used. The few different sizes in diameter that may be thus taken care of are very limited. Additional pots must thus be purchased when faced with a multiple of sizes that need soldering as is the case in any repair shop for dynamoelectric machines. Pot soldering is thus a fine method for any plant having a large production flow of no more than two or three given armature diameters.

Hand soldering is very time consuming and the quality of the final job is not too good. In any case, it is unpredictable. This is the case with low temperature soldering but in the last few years, with the increased use of Class H insulation material and the temperature going up in the armatures, there is an urgent need to go to high temperature soldering, for example, using 9344–1 solder. Using the hand soldering method with soldering irons using 9344–1 solder and operating on a preheated armature makes the soldering operation even more difficult. It is hard to maintain enough heat in the iron and in the armature for the long time it takes to do the soldering, so that the solder will not flow properly and the result is a poor quality joint.

It is thus an object of this invention to provide, for the soldering of commutator riser necks to the coil ends, apparatus having a much lower cost than apparatus of the prior art and the provision of high quality solder joints.

It is also an object of this invention to reduce the human error to the very minimum in the soldering operation and obtain a quality solder joint equivalent to pot soldering and which, like pot soldering, relies on capillary action for soldering.

Another object of this invention is the provision of apparatus that is not limited to a small range of armature diameters but will, with equal simplicity, handle armatures having a diameter of a few inches to armatures as much as 48" in diameter.

The objects recited are merely illustrative. Other objects and advantages will become more apparent from a study of the following specification when done with reference to the drawings, in which:

FIG. 8 is a detail showing how the molten solder bathes the commutator riser necks.

Figure 1:
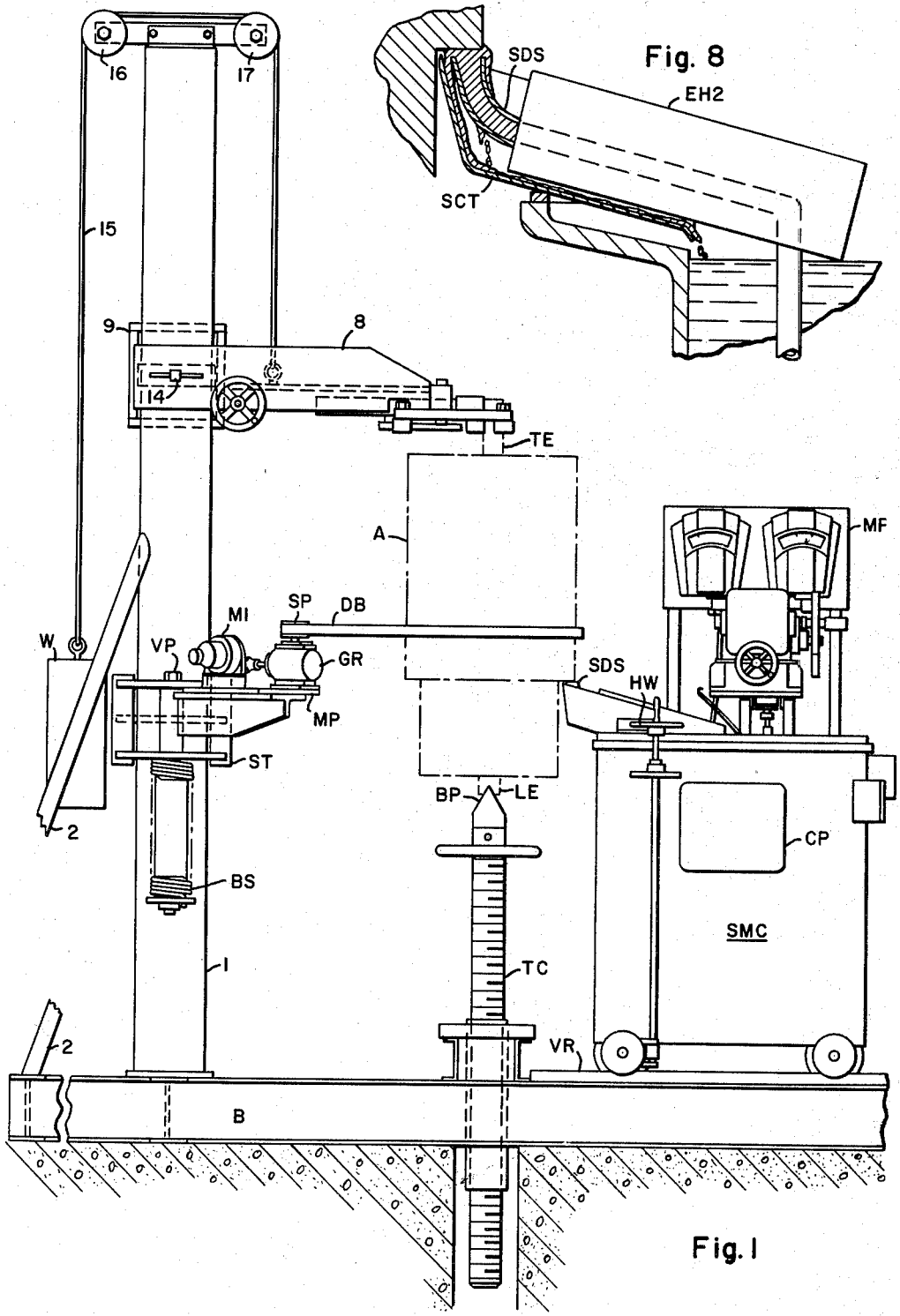
FIGURE 1 is a front view of the complete automatic soldering machine.
Figure 2:
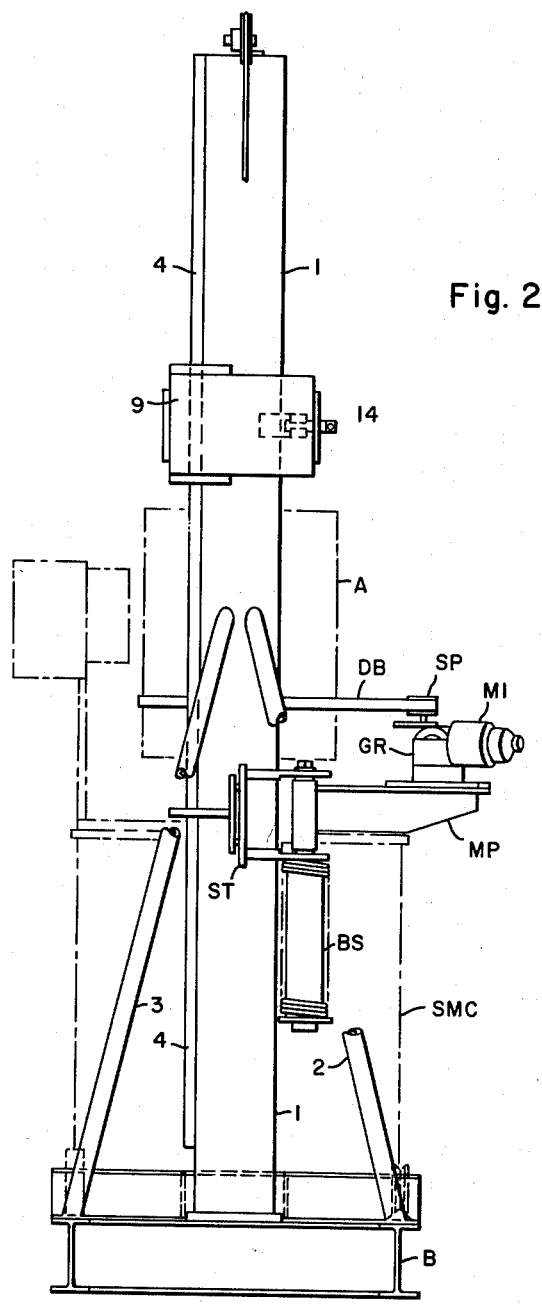
FIG. 2 is a view of the armature supporting stand as seen from the left.
Figure 3:
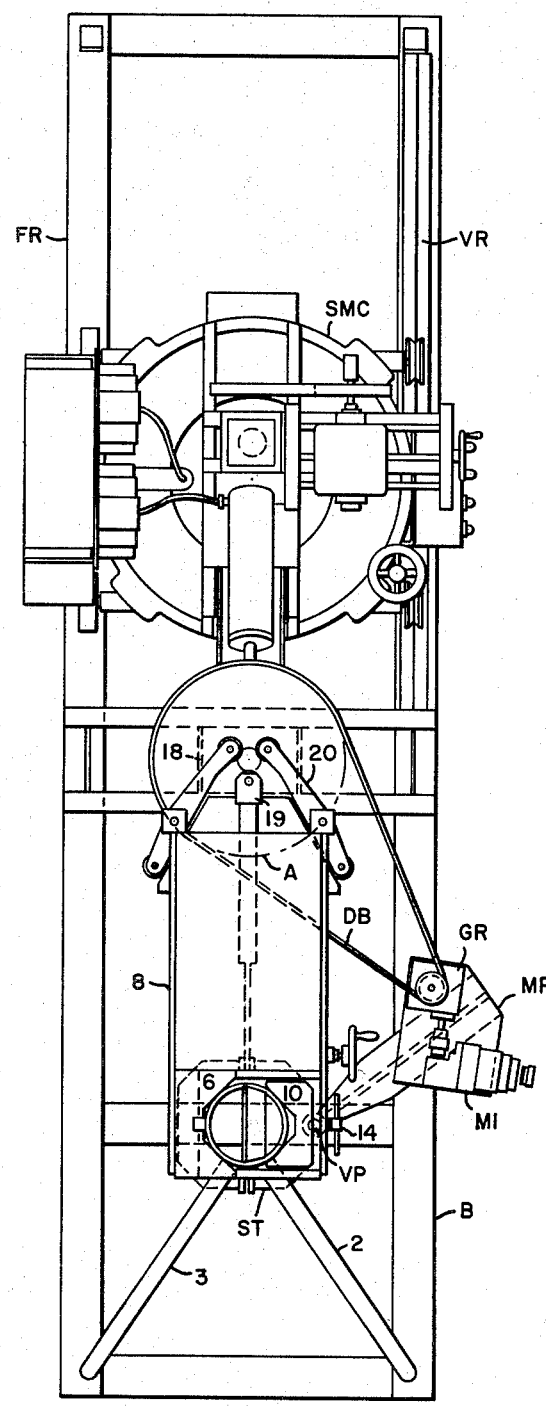
FIG. 3 is a plan view of the subject matter shown in FIG. 1.
Figure 5:
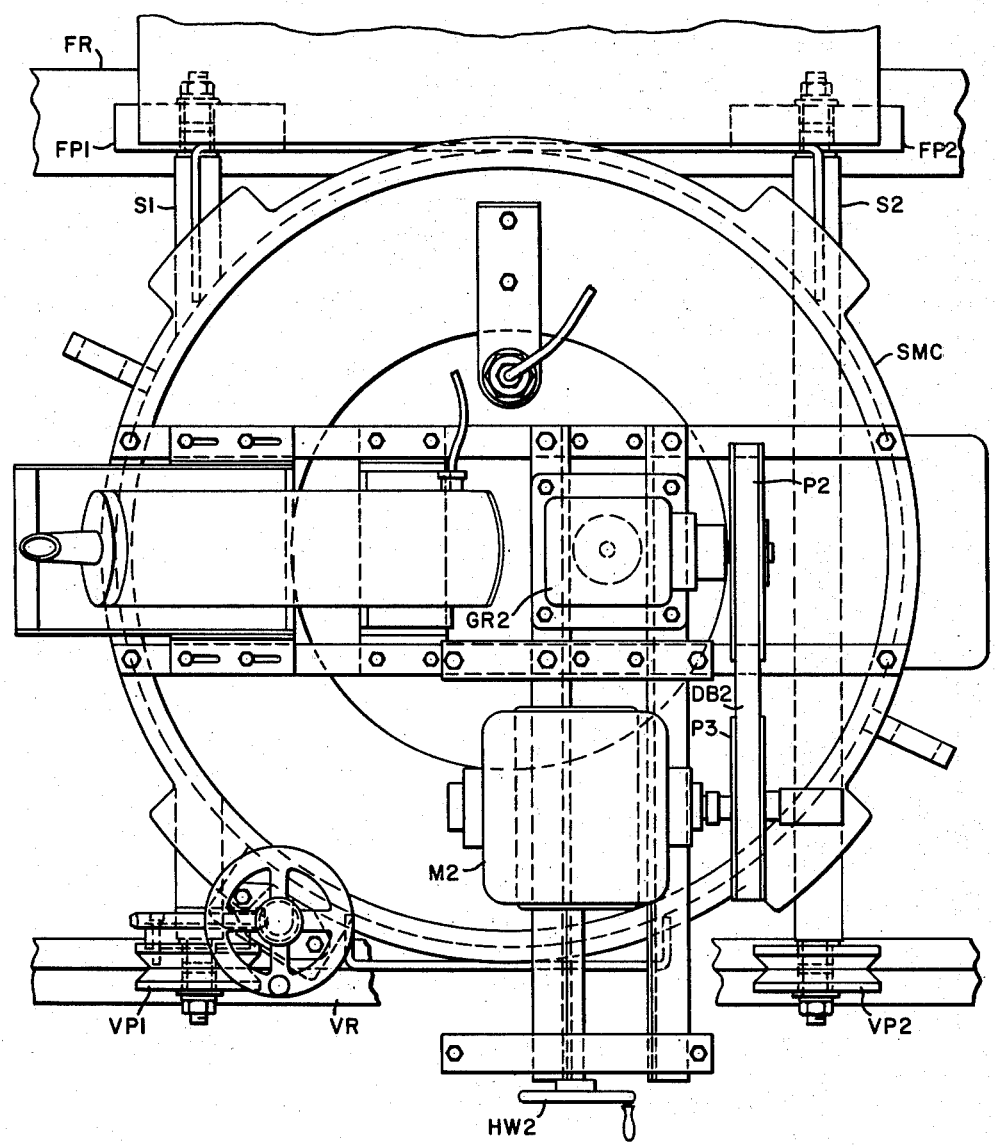
FIG. 5 is a plan view of the showing in FIG. 4.
Figure 6:
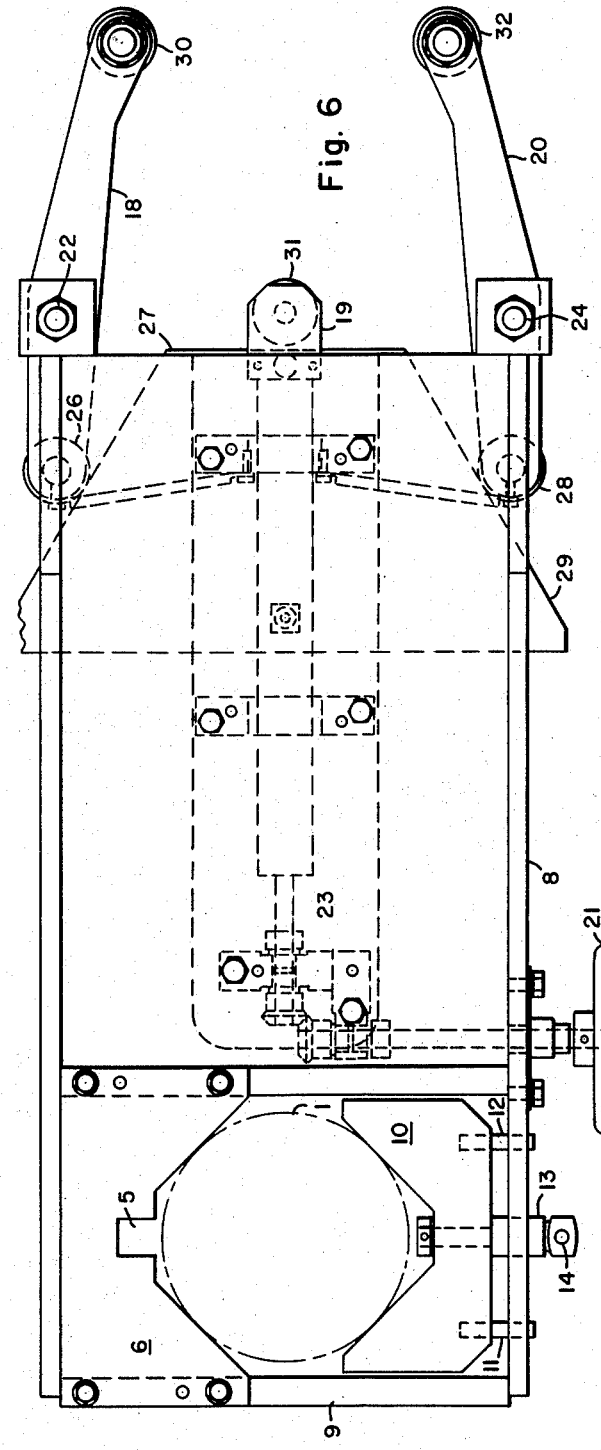
FIG. 6 is a plan view, in considerable detail, of the armature holding and centering devices.
Figure 7:
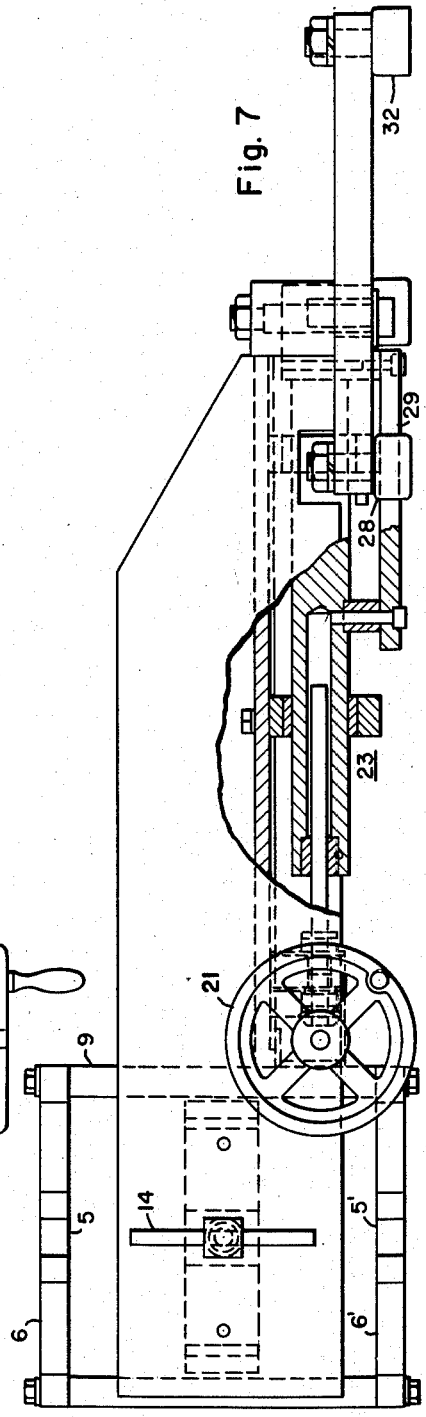
FIG. 7 is a front view, with parts in section, of the showing in FIG. 6.

In FIGS. 1, 2 and 3 the soldering machine is shown having a base B, which is preferably constructed of relatively heavy iron beams, and carries a pair of rails, one of which VR has a square pitch or inverted V-shaped construction and the other of which FR has a flat upper surface. See FIG. 5. The solder supplying cart including a solder melting container SMC is mounted on four wheels two of which VP1 and VP2 have an outer peripheral contour of a V-pulley and the other of which FP1 and FP2 have an outer peripheral contour of a flat pulley. Wheels VP1 and FP1 are mounted for rotation on the ends respectively of shaft S1 and wheels VP2 and FP2 are mounted for rotation on the ends, respectively of shaft S2. The wheels VP1 and VP2 are disposed to rotate in the same vertical plane, and fit on the rail VR and thus accurately guide the horizontal movement of the solder melting container SMC radially with respect to the axis of the operatively positioned armature A, the commutator riser necks of which are to be soldered. This will become clearer hereinafter, when a more detailed description of the solder melting container will be made.

The base substantially midway of its length and midway of its side bars is provided with a vertically adjustable bearing point BP for accurately positioning the lower end LE of the shaft of the workpiece armature A. This bearing point BP may be rapidly roughly adjusted vertically by vertically shifting the sleeve receiving the threaded column TC and then a micrometric further vertical adjustment may be made by turning the column TC. The commutator riser necks may thus very accurately be adjusted to fit directly over the solder delivering spout SDS of the solder melting container. The arrangement is such that the container, and more particularly the spout SDS, moves radially with respect to the axis of threaded column TC. That is, the spout SDS moves in a horizontal plane perpendicularly to the axis of threaded column TC.

To the left of the column TC, at a distance somewhat greater than half of the diameter of the largest armature to be vertically mounted on column TC, the base carries a vertically disposed cylindrical column 1. This column, or pipe, is rigidly secured to the base at the bottom and has a pair of struts 2 and 3 welded to the column about two fifths of its length, from the bottom and at their bottom ends welded to the base B. The arrangement of the struts is as shown in FIGS. 1, 2 and 3 to provide a rigid triangular base for the column 1.

The column 1 is provided with a member 4 square, or rectangular, in transverse section for receiving the notches 5 and 5' in the bottoms of each of the V-shaped vertically spaced plates 6 and 6' on member 8. The member 8 is in the shape of a shallow U with the bight of the U removed at the left end to form a support for a rectangular frame 9 for receiving the column 1 within its confines. The plates 6 and 6' are rigidly secured within the rear end of the frame 9. The member 4 fitting into the notches provides a vertical guideway for member 8 and all the elements mounted thereon.

A plate 10 generally similar in shape to plates 6 and 6' is mounted on the frame 9 in facing relation to the plates 6 and 6'. The disposition of plate 10 is midway between plates 6 and 6', with plate 10 being guided for horizontal movement by guide bars, or studs, 11 and 12. These studs thus prevent angular tilting of the plate 10. A suitable lead screw 13 journaled in the frame 9 and threaded in a suitable lug in plate 10 and having the actuator 14, provides for horizontal movement of the plate 10 so that the member 8 and all parts attached thereto may thus be rigidly secured to any vertically adjusted position on column 1.

The member 8 and associated parts are counter-balanced by the weight W secured to the left end of the cable 15 passing over pulleys 16 and 17 to have its right end secured, as shown, to member 8.

The member 8 is provided with three fingers 18, 19 and 20. Fingers 18 and 20 are pivoted at 22 and 24 and have rollers 26 and 28 at their left-hand ends. Roller 26 engages cam 27 and roller 28 engages cam 29. The cams 27 and 29 are movable as a unit and when moved toward the right cause the outer ends of fingers 18 and 20 to move equal amounts directly toward a point that is directly above the bearing point BP. Hand-wheel 21, when actuated, through the mechanism 23 shown actuates the finger 19 directly toward the same point above bearing point BP toward which the outer ends of fingers 18 and 20 move. It is thus apparent that when an armature has the lower end of its shaft LE positioned on BP the hand-wheel 21 is actuated so that the rollers 30, 31 and 32 at the outer ends of fingers 18, 19 and 21, respectively engage the top end TE of the armature shaft. Since the rollers 30, 31 and 32 are of the roller bearing type and since the point BP does not present much friction, the armature may be freely rotated on point BP.

To thus rotatably hold the armature in a vertical position it is, of course, apparent that member 8 must have the proper adjusted position on column 1 and be secured, or locked, to it by the means heretofore explained. To provide for the proper opening of the fingers when the cams 27 and 29, and finger 19 are moved to the left the fingers 18 and 20 are spring-biased so that the rollers 26 and 28 are always against their respective cams.

To provide for the proper rotation of the armature a suitable motor M1, through a suitable gear reduction unit GR, a small pulley SP and drive belt DB disposed on the pulley SP and about the armature A, drives the armature at a relatively slow speed.

The motor M1 is mounted on a spring-biased platform MP pivoted about the vertical pivot VP. The action of the biasing spring BS is such as to pull the drive belt taut. The structure ST having the pivot VP is secured at a suitable point on column 1 so that the drive belt for all diameters of armatures upon which soldering operations are performed is a suitable distance above the commutator necks.

The solder melting container includes an electrically heated solder pot SP and electric control circuitry and switches mounted on panel CP, thermometers, located at strategic points in the pot, and meters mounted on the meter panel MP.

The pot also contains a positive displacement pump PDP coupled, through a suitable shaft S2, gear reduction unit GR2, V-pulleys P2 and P3 coupled by the V-belt DB2, to the adjustable speed motor M2.

The motor M2 is disposed on a horizontally movable platform which may be moved forward and back by a suitable lead screw actuated by the hand wheel HW2. Operation of the motor to bodily move toward or away from V-pulley P2 causes the V-belt to take a deeper or shallower position in V-pulley P3 which has spring-biased relatively movable side portions. This provides for very accurate speed control of the pump.

Figure 4:
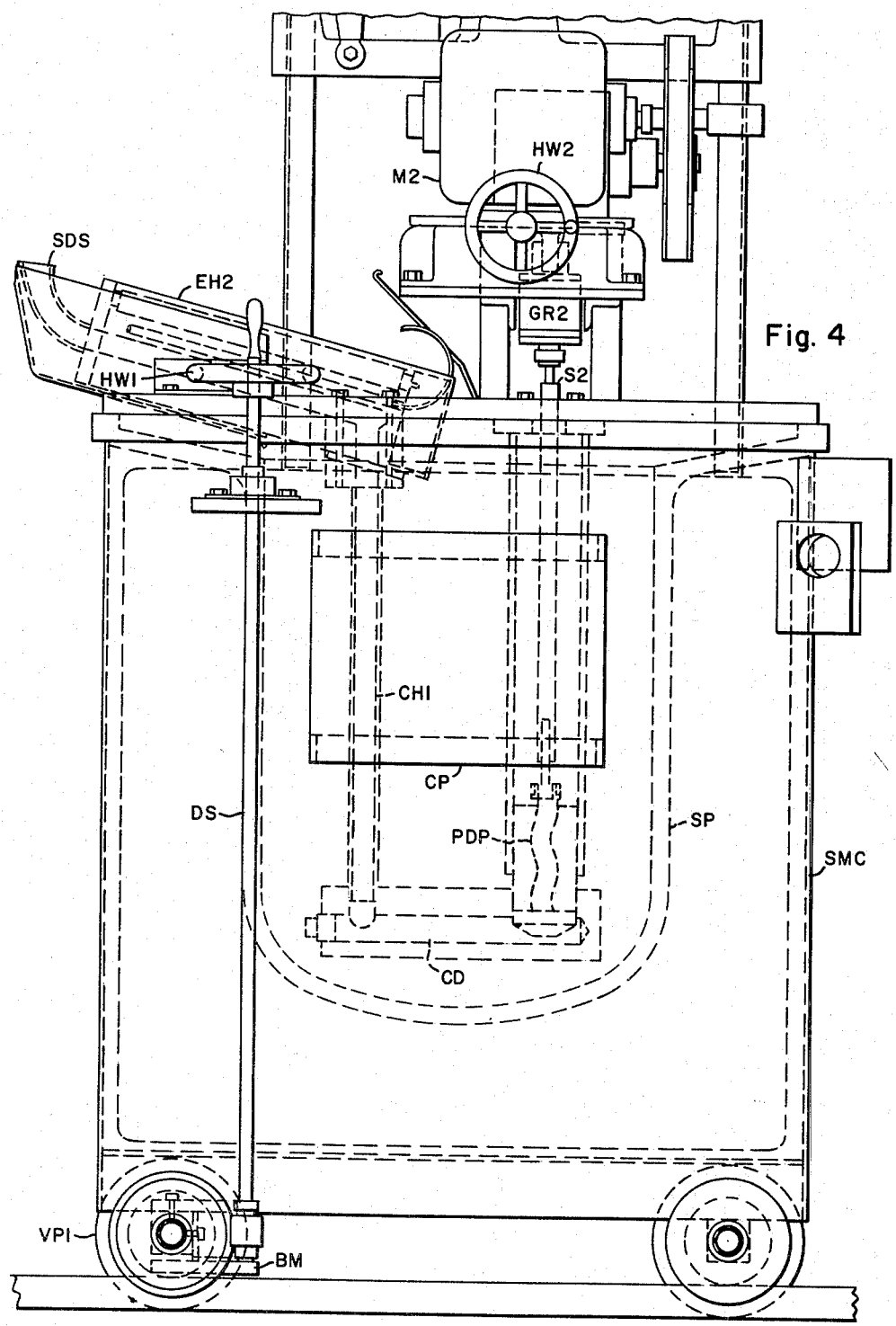
FIG. 4 is a front view in some detail of the solder melting container.

The pump PDP is located in the solder moving channel CH1 that receives molten solder at the right (see FIG. 4) and pumps the molten solder through the conduit CD, up channel CH1 and up toward the left through the solder delivering spout SDS. The spout over the greater right-hand portion of its length is surrounded by the electric heater EH2. In normal operation the molten solder flows out of the spout and bathes the bottom surface and corner of the commutator riser necks. The excess solder in a continuous flow spills over and is collected by the solder collecting tray SCT diverting the molten solder back into the pot. For a clearest view reference should be had to FIG. 8.

In practice, to solder the commutator riser necks, the procedure very generally and briefly stated is as follows: The solder melting container is disposed at the right end of its rails. The solder may be heating or hot when in that position.

An armature that has been amply pre-heated is, by means of a crane and suitable gripping mechanisms engaging the end TE moved in position to be placed on the bearing point BP. Before lowering the armature on point BP, the belt DB is slipped over the armature and it is then lowered on point BP. The fingers 18, 19 and 20 are, of course, for this operation wide apart.

When the armature shaft end LE rests on BP, the fingers are caused to engage end TE. The member 8 is fixed on column 1 and the crane coupling is removed and the crane pulled back. The motor M1 is swung toward the armature and the belt placed on pulley SP. The motor is released. The bias spring BS tightens the belt. The armature may now be rotated for the soldering operation.

The solder melting container is now brought toward the armature by rotating hand wheel HW1. The hand wheel HW1 through drive shaft DS and a worm engaging a worm wheel coupled to pulley VP1 provides an irreversible drive mechanism for moving the solder melting container and for holding it into the position to which it is moved. When column TC has been properly adjusted so that the solder delivering spout is in the position shown in FIGS. 1 and 8 then column TC is no longer adjusted. The container SMC will now retain its proper position.

When the indicating lights and meters ME1 and ME2 indicate that the solder is hot enough and that the spout is hot enough then the pump motor is started.

The solder thus wells up and bathes the face and edge of the commutator necks, or risers, and by capillary action is pulled up and solders the coil leads to the commutator risers. The capillary action procedure is the same principle used in the pot soldering method. As the soldering action is completed, the armature is slowly rotated to bring new surfaces into the region where the solder wells up to bathe the face of the risers. The time of rotation for the armature is determined by how long it takes for capillary action to take place in the armature risers. As a rule a movement of one inch per minute over, or through, the solder welling up from spout SDS is a good speed. In some cases this speed may be as much as four times this fast.

By the use of this apparatus and the procedure being followed the savings on any armature as against the hand soldering method can easily be at least 50%, and may be considerably more. Further the quality of the joints made is much better, the initial cost of the apparatus is much lower, and high temperature solder is much cheaper.

While but one embodiment of this invention has been disclosed it is apparent that modifications within the scope of this invention may readily be made by those skilled in the art after having had the benefit of the disclosure hereinbefore made.

We claim as our invention:

1. A machine for substantially automatically soldering the commutator risers to the coil leads in the workpiece, namely the armature of a dynamoelectric machine provided with a commutator, including in combination, a base, two parallel horizontal rails on the base, a solder supplying device, said device having a plurality of supporting wheels engaging the rails for accurately rectilinearly moving said solder supplying device on the base, a vertically adjustable first bearing means on said base for rotatably receiving the bottom end of the shaft of the workpiece, a vertically adjustable second bearing means on said base and disposed directly above the first bearing means for rotatably receiving the top end of the shaft of the workpiece, means for rotating the workpiece at any one of a plurality of selected speeds, a solder pot disposed on said device, a solder discharge channel in part disposed down in the pot but with a part slanting upwardly and outwardly from the pot to a point beyond the edge of the pot and at its outer upper end terminating in a solder-discharge spout having a horizontal discharge end, the vertical adjustment of the first bearing means and the horizontal positioning of the spout being such that the horizontal downwardly directed surfaces of the commutator risers will fall directly above and in closely spaced relationship to the horizontal discharge end of the spout, means for melting the solder in the pot and maintaining the solder at the proper soldering temperature, a pump, driving means for the pump, said pump being disposed in the pot to move molten solder, when driven by said driving means, along the channel and out of the spout so that the solder wells up and bathes the lower surfaces of the commutator risers to thus cause effective soldering, by capillary action, of the commutator risers to the coil leads of the workpiece.

2. A machine for substantially automatically soldering the commutator risers to the coil leads in the workpiece, namely the armature of a dynamoelectric machine provided with a commutator, including in combination, a base, two parallel horizontal rails on the base, a solder supplying device, said device having a plurality of supporting wheels engaging the rails for accurately rectilinearly moving said solder supplying device on the base, a vertically adjustable first bearing means on said base for rotatably receiving the bottom end of the shaft of the workpiece, a vertically adjustable second bearing means on said base and disposed directly above the first bearing means for rotatably receiving the top end of the shaft of the workpiece, means for rotating the workpiece at any one of a plurality of selected speeds, a solder pot disposed on said device, a solder discharge channel in part disposed down in the pot but with a part slanting upwardly and outwardly from the pot to a point beyond the edge of the pot and at its outer upper end terminating in a solder-discharge spout having a horizontal discharge end, a heater disposed in heating relation to the part of the discharge channel slanting upwardly and outwardly, the vertical adjustment of the first bearing means and the horizontal positoning of the spout being such that the horiozntal downwardly directed surfaces of the commutator risers will fall directly above and in closely spaced relationship to the horizontal discharge end of the spout, means for melting the solder in the pot and maintaining the solder at the proper soldering temperature, a pump, driving means for the pump, said pump being disposed in the pot to move molten solder, when driven by said driving means, along the channel and out of the spout so that the solder wells up and bathes and lower surfaces of the commutator risers to thus cause effective soldering, by capillary action, of the commutator risers to the coil leads of the workpiece.

3. A machine for substantially automatically soldering the commutator risers to the coil leads in the workpiece, namely the armature of a dynamoelectric machine provided with a commutator, including in combination, a base, two parallel horizontal rails on the base, at least one of said rails having a surface contour to function as a guide rail, a solder supplying device, said device having a plurality of supporting wheels engaging the rails, at least two of said wheels being disposed to rotate in the same plane having like peripheral contours that match the surface contour of the guide rail for accurately rectilinearly moving said solder supplying device on the base, a vertically adjustable first bearing means on said base for rotatably receiving the bottom end of the shaft of the workpiece, a vertically adjustable second bearing means on said base and disposed directly above the first bearing means for rotatably receiving the top end of the shaft of the workpiece, means for rotating the workpiece at any one of a plurality of selected speeds, a solder pot disposed on said device, a solder discharge channel in part disposed down in the pot but with a part slanting upwardly and outwardly from the pot to a point beyond the edge of the pot and at its outer upper end terminating in a solder-discharge spout having a horziontal discharge end, a heater disposed in heating relation to the part of the discharge channel slanting upwardly and outwardly, the vertical adjustment of the first bearing means and the horizontal positioning of the spout being such that the horizontal downwardly directed surfaces of the commutator risers will fall directly above and in closely spaced relationship to the horizontal discharge end of the spout, means for melting the solder in the pot and maintaining the solder at the proper soldering temperature, a pump, driving means for the pump, said pump being disposed in the pot to move molten solder, when driven by said driving means, along the channel and out of the spout so that the solder wells up and bathes the lower surfaces of the commutator risers to thus cause effective soldering, by capillary action, of the commutator risers to the coil leads of the workpiece.

4. A machine for substantially automatically soldering the commutator risers to the coil leads in the workpiece, namely the armature of a dynamoelectric machine provided with a commutator, including a combination, a base, two parallel horizontal rails on the base, at least one of said rails having a surface contour to function as a guide rail, a solder supplying device, said device having a plurality of supporting wheels engaging the rails, at least two of said wheels being disposed to rotate in the same plane and having like peripheral contours that match the surface contour of the guide rail for accurately rectilinearly moving said solder supplying device on the base, means for securing said device at any position of adjustment on said rails, a vertically adjustable first bearing means on said base for rotatably receiving the bottom end of the shaft of the workpiece, a vertically adjustable second bearing means on said base and disposed directly above the first bearing means for rotatably receiving the top end of the shaft of the workpiece, means for rotating the workpiece at any one of a plurality of selected speeds, a solder pot disposed on said device, a solder discharge channel in part disposed down in the pot but with a part slanting upwardly and outwardly from the pot to a point beyond the edge of the pot and at its outer upper end terminating in a solder-discharge spout having a horizontal discharge end, a heater disposed in heating relation to the part of the discharge channel slanting upwardly and outwardly, the vertical adjustment of the first bearing means and the horizontal positioning of the spout being such that the horizontal downwardly directed surfaces of the commutator risers will fall directly above and in closely spaced relaionship to the horizontal discharge end of the spout, means for melting the solder in the pot and maintaining the solder at the proper soldering temperature, a pump, driving means for the pump, said pump being disposed in the pot to move molten solder, when driven by said driving means, along the channel and out of the spout so that the solder wells up and bathes the lower surfaces of the commutator risers to thus cause effective soldering, by capillary action, of the commutator risers to the coil ends of the workpiece.

References Cited by the Examiner

UNITED STATES PATENTS

| | | | |
|---|---|---|---|
| 767,465 | 8/04 | Wirth et al. | 113—93 |
| 1,195,446 | 8/16 | Davis | 113—130 |
| 1,446,667 | 2/23 | Schulz | 113—93 |
| 1,740,033 | 12/29 | Pinckney | 113—134 |
| 1,750,312 | 3/30 | Emmert | 113—93 XR |
| 1,789,709 | 1/31 | Poole | 113—95 XR |
| 1,856,757 | 5/32 | Goad | 113—95 |
| 1,904,913 | 4/33 | Adams | 113—134 XR |
| 2,258,670 | 10/41 | Anderson | 113—133 XR |
| 2,342,041 | 2/44 | De Bold | 113—128 XR |
| 2,479,197 | 8/49 | Anderson | 113—130 |
| 2,515,097 | 7/50 | Schryber | 113—93 XR |
| 2,771,049 | 11/56 | Fish | 113—126 |
| 3,016,854 | 1/62 | Giles | 113—93 |

FOREIGN PATENTS 382,902  10/23  Germany.

CHARLES W. LANHAM, *Primary Examiner.*

WHITMORE A. WILTZ, JOHN F. CAMPBELL,
*Examiners.*